United States Patent
Sustic et al.

(10) Patent No.: US 10,752,815 B2
(45) Date of Patent: Aug. 25, 2020

(54) LOW MOLECULAR WEIGHT BUTENE-1-CO-HEXENE-1 AMORPHOUS POLY ALPHA OLEFINS FOR HOT-MELT ADHESIVES WITH ENHANCED PROPERTIES

(71) Applicant: REXtac, LLC, Odessa, TX (US)

(72) Inventors: Andres Sustic, Odessa, TX (US); Nick Fowler, Odessa, TX (US); John Passmore, Odessa, TX (US)

(73) Assignee: REXTAC LLC, Odessa, TX (US)

(*) Notice: Subject to any disclaimer, the term of this patent is extended or adjusted under 35 U.S.C. 154(b) by 0 days.

(21) Appl. No.: 16/539,988

(22) Filed: Aug. 13, 2019

(65) Prior Publication Data

US 2019/0367784 A1 Dec. 5, 2019

Related U.S. Application Data

(63) Continuation-in-part of application No. 16/153,895, filed on Oct. 8, 2018, now Pat. No. 10,421,886, which is a continuation of application No. 15/486,115, filed on Apr. 12, 2017, now abandoned, and a continuation of application No. 16/111,494, filed on Aug. 24, 2018, now Pat. No. 10,266,731.

(60) Provisional application No. 62/321,663, filed on Apr. 12, 2016, provisional application No. 62/558,670, filed on Sep. 14, 2017.

(51) Int. Cl.
| | |
|---|---|
| C08F 210/08 | (2006.01) |
| C08J 3/00 | (2006.01) |
| C08L 23/20 | (2006.01) |
| C09J 123/14 | (2006.01) |
| C09J 123/20 | (2006.01) |

(52) U.S. Cl.
CPC .......... *C09J 123/14* (2013.01); *C08F 210/08* (2013.01); *C08J 3/00* (2013.01); *C08L 23/20* (2013.01); *C09J 123/20* (2013.01); *C08L 2205/035* (2013.01)

(58) Field of Classification Search
CPC .......... C08J 3/00; C09J 123/14; C09J 123/20; C08F 210/08; C08L 23/20; C08L 2205/035
See application file for complete search history.

(56) References Cited

U.S. PATENT DOCUMENTS

| | | |
|---|---|---|
| 3,954,697 A | 5/1976 | McConnell et al. |
| 4,072,812 A | 2/1978 | McConnell et al. |
| 4,072,813 A | 2/1978 | McConnell et al. |
| 4,169,116 A | 9/1979 | Trotter et al. |
| 4,210,570 A | 7/1980 | Trotter et al. |
| 4,259,470 A | 3/1981 | Trotter et al. |
| 4,264,756 A | 4/1981 | Trotter et al. |
| 4,288,358 A | 9/1981 | Trotter et al. |
| 4,309,522 A | 1/1982 | Dietrich et al. |
| 4,322,514 A | 5/1982 | Miyoshi et al. |
| 4,415,718 A | 11/1983 | Miyoshi et al. |
| 4,826,939 A | 5/1989 | Stuart, Jr. |
| 4,847,340 A | 7/1989 | Allen et al. |
| 4,886,853 A | 12/1989 | Foster et al. |
| 5,262,216 A | 11/1993 | Popat et al. |
| 5,274,037 A | 12/1993 | Miller |
| 5,302,675 A | 4/1994 | Sustic et al. |
| 5,637,665 A | 6/1997 | Sustic et al. |
| 5,681,913 A | 10/1997 | Sustic et al. |
| 5,714,554 A | 2/1998 | Sustic et al. |
| 5,763,547 A | 6/1998 | Kolthammer et al. |
| 6,586,536 B1 | 7/2003 | Kelley |
| 6,586,543 B1 | 7/2003 | Wey et al. |
| 6,653,385 B2 | 11/2003 | Wang et al. |
| 6,872,279 B1 | 3/2005 | Kolowrot et al. |
| 7,517,579 B2 | 4/2009 | Campbell et al. |
| 8,076,407 B2 | 12/2011 | Ellis et al. |
| 8,242,198 B2 | 8/2012 | Jiang et al. |
| 8,551,270 B2 | 10/2013 | Previty et al. |
| 8,702,900 B2 | 4/2014 | Hu et al. |
| 8,865,824 B2 | 10/2014 | Bunnelle et al. |
| 8,957,166 B2 | 2/2015 | Kobayashi et al. |
| 9,982,098 B2 | 5/2018 | Sustic et al. |
| 10,160,888 B2 | 12/2018 | Sustic et al. |
| 10,266,731 B2 | 4/2019 | Sustic et al. |
| 10,421,886 B2* | 9/2019 | Sustic .................... C09J 123/14 |
| 2006/0235134 A1 | 10/2006 | Bach |
| 2009/0203847 A1* | 8/2009 | Ellis ....................... C08L 23/04 |
| | | 525/221 |
| 2010/0063173 A1 | 3/2010 | Corzani |
| 2012/0149827 A1* | 6/2012 | Hu ......................... C09J 123/02 |
| | | 524/505 |

(Continued)

FOREIGN PATENT DOCUMENTS

EP 0211311 A2 2/1987

*Primary Examiner* — Patrick D Niland
(74) *Attorney, Agent, or Firm* — Nolte Intellectual Property Law Group

(57) ABSTRACT

A hot-melt formulation includes a butene-1-co-hexene-1 copolymer formed from butene-1 and hexene-1 monomers synthesized using a supported Ziegler-Natta catalyst reacted with an organometallic cocatalyst, a styrenic block copolymer with less than 15 percent bound styrene, a high melt viscosity metallocene catalyzed polyolefin, a high melt viscosity polypropylene with a melt viscosity above 18,000 cps, and a low molecular weight polyethylene wax, wherein the melt viscosity of the wax is less than 1,000 centipoise at a temperature of 350 degrees Fahrenheit.

14 Claims, 2 Drawing Sheets

(56) References Cited

U.S. PATENT DOCUMENTS

2015/0148473 A1 5/2015 Sustic et al.
2017/0292047 A1 10/2017 Sustic et al.

* cited by examiner

TABLE 1.

| Example # | Butene-1, mL | Hexene-1, mL | Butene-1, wt% | Hexene-1, wt% | Hydrogen, psi | F2/F3 |
|---|---|---|---|---|---|---|
| 1 | 375 | 325 | 53.6 | 46.4 | 85 | 250 |
| 2 | 375 | 325 | 53.6 | 46.4 | 85 | 250 |
| 3 | 375 | 325 | 53.6 | 46.4 | 85 | 250 |
| 4 | 500 | 200 | 71.4 | 28.6 | 120 | 400 |
| 5 | 500 | 200 | 71.4 | 28.6 | 50 | 100 |
| 6 | 500 | 200 | 71.4 | 28.6 | 50 | 400 |
| 7 | 250 | 450 | 55.6 | 44.4 | 50 | 400 |
| 8 | 500 | 200 | 71.4 | 28.6 | 50 | 400 |
| 9 | 500 | 200 | 71.4 | 28.6 | 120 | 400 |
| 10 | 250 | 450 | 35.7 | 64.3 | 120 | 400 |
| 11 | 375 | 325 | 53.6 | 46.4 | 85 | 250 |
| 12 | 500 | 200 | 71.4 | 28.6 | 120 | 100 |
| 13 | 250 | 450 | 35.7 | 64.3 | 50 | 100 |
| 14 | 250 | 450 | 35.7 | 64.3 | 50 | 100 |
| 15 | 250 | 450 | 35.7 | 64.3 | 120 | 100 |
| 16 | 250 | 450 | 35.7 | 64.3 | 120 | 400 |
| 17 | 375 | 325 | 53.6 | 46.4 | 85 | 250 |
| 18 | 500 | 200 | 71.4 | 28.6 | 120 | 100 |
| 19 | 250 | 450 | 35.7 | 64.3 | 120 | 100 |
| 20 | 250 | 450 | 35.7 | 64.3 | 50 | 400 |
| 21 | 375 | 325 | 53.6 | 46.4 | 85 | 250 |
| 22 | 375 | 325 | 53.6 | 46.4 | 85 | 250 |
| 23 | 500 | 200 | 71.4 | 28.6 | 50 | 100 |

FIG. 1

TABLE 2.

| Example # | MV, cps | NP, dmm | BBSP, F | RBT, cm | Loop Tack Test LBF-FT/1"² 12"/min | HoPo, min 500g Wt. 80°F | HoPo, min 1000g Wt. 80°F | HoPo, min 500g Wt. 40°C | HoPo, min 1000g Wt. 40°C |
|---|---|---|---|---|---|---|---|---|---|
| 1 | 3270 | 203 | 102 | 4.0 ± 0.5 | 8.6 ± 1.5 | 2.6 ± 0.2 | 1.2 ± <1 | 0.8 ± 0.3 | 0.2 ± 0.1 |
| 2 | 3965 | 213 | 113 | 3.0 ± 0.4 | 8.5 ± 0.9 | 3.2 ± 0.5 | 1.8 ± 0.1 | 0.8 ± 0.2 | 0.5 ± 0.2 |
| 3 | 2990 | 235 | 111 | 3.1 ± 0.5 | 7.8 ± 1.3 | 2.9 ± 0.3 | 1.5 ± 0.1 | 1.0 ± 0.1 | 0.6 ± 0.1 |
| 4 | 785 | 126 | 231 | 2.1 ± 0.2 | 7.7 ± 0.1 | 16 ± 2 | 6.2 ± 0.7 | 3.6 ± 0.2 | 1.4 ± 0.1 |
| 5 | 4625 | 72 | 152 | 4.3 ± 0.9 | 8.5 ± 1.0 | 57 ± 15 | 19 ± 1 | 8.4 ± 0.6 | 2.4 ± 0.1 |
| 6 | 10980 | 100 | 161 | 5.8 ± 0.2 | 9.9 ± 0.5 | >5hrs. | 59 ± 3 | 11 ± 0.9 | 3.5 ± 0.1 |
| 7 | 15680 | 145 | 156 | 4.1 ± 0.5 | 9.0 ± 0.5 | 6.6 ± 0.4 | 2.8 ± 0.1 | 2.1 ± 0.1 | 0.9 ± 0.1 |
| 8 | 7488 | 99 | 160 | 4.5 ± 0.3 | 9.4 ± 0.4 | >5hrs. | 94 ± 11 | 17 ± 0.8 | 5.2 ± 0.3 |
| 9 | 1037 | 219 | 131 | 2.9 ± 0.4 | 10.9 ± 1.8 | 18 ± 0.4 | 6.0 ± 0.6 | 1.9 ± 0.1 | 0.5 ± 0.1 |
| 10 | 3135 | 276 | 93 | 2.5 ± 0.4 | 6.4 ± 0.8 | 1.6 ± 0.3 | 1.1 ± <0.1 | 0.4 ± 0.1 | 0.2 ± 0.1 |
| 11 | 3255 | 202 | 131 | 2.8 ± 0.4 | 7.6 ± 1.1 | 4.6 ± 0.5 | 2.1 ± 0.3 | 1.2 ± 0.1 | 0.4 ± 0.1 |
| 12 | 1638 | 50 | 134 | 2.3 ± 0.2 | 6.7 ± 0.2 | >12hrs. | 96 ± 4 | 7.9 ± 0.8 | 2.3 ± 0.1 |
| 13 | 13100 | 140 | 152 | 3.2 ± 0.5 | 8.6 ± 0.6 | 8.7 ± 0.3 | 3.4 ± 0.3 | 1.9 ± 0.2 | 0.8 ± 0.1 |
| 14 | 14350 | 147 | 152 | 3.2 ± 0.2 | 6.6 ± 0.8 | 8.1 ± <0.1 | 2.2 ± 0.1 | 3.2 ± 0.3 | 0.9 ± 0.1 |
| 15 | 3015 | 257 | 113 | 2.7 ± 0.4 | 7.5 ± 1.1 | 2.1 ± 0.1 | 1.0 ± 0.1 | 0.7 ± 0.1 | 0.2 ± 0.1 |
| 16 | 2535 | 282 | 94 | 3.3 ± 0.4 | 8.6 ± 0.5 | 2.5 ± 0.2 | 1.3 ± 0.2 | 1.0 ± 0.2 | 0.4 ± <0.1 |
| 17 | 4775 | 200 | 123 | 4.2 ± 0.3 | 8.6 ± 0.4 | 3.4 ± 0.3 | 1.6 ± 0.1 | 0.8 ± 0.1 | 0.2 ± 0.1 |
| 18 | 1518 | 192 | 140 | 3.0 ± 0.6 | 9.1 ± 1.0 | 74 ± 6 | 26 ± 1 | 3.9 ± 0.2 | 1.0 ± <0.1 |
| 19 | 5263 | 215 | 128 | 2.5 ± 0.4 | 9.2 ± 0.6 | 3.5 ± 0.3 | 1.1 ± 0.1 | 1.6 ± 0.2 | 0.5 ± 0.1 |
| 20 | 10600 | 144 | 151 | 1.4 ± 0.2 | 8.2 ± 0.7 | 7.3 ± 0.4 | 2.9 ± 0.2 | 2.1 ± 0.5 | 0.9 ± 0.2 |
| 21 | 3695 | 232 | 110 | 1.7 ± 0.3 | 8.3 ± 0.8 | 3.0 ± 0.3 | 1.4 ± 0.1 | 0.7 ± 0.2 | 0.5 ± 0.2 |
| 22 | 6575 | 158 | 152 | 1.3 ± 0.2 | 8.3 ± 0.6 | 7.4 ± 0.3 | 3.0 ± 0.1 | 1.4 ± 0.2 | 0.6 ± <0.1 |
| 23 | 7075 | 32 | 160 | 1.5 ± 0.5 | 6.5 ± 0.6 | >24 | >24 | >24 | 145 ± 10 |

FIG. 2

LOW MOLECULAR WEIGHT BUTENE-1-CO-HEXENE-1 AMORPHOUS POLY ALPHA OLEFINS FOR HOT-MELT ADHESIVES WITH ENHANCED PROPERTIES

CROSS-REFERENCE TO RELATED APPLICATIONS

The present application is a continuation in part of and claims priority to co-pending U.S. patent application Ser. No. 16/153,895 filed on Oct. 8, 2018. U.S. patent application Ser. No. 16/153,895 is: a continuation of U.S. patent application Ser. No. 15/486,115 filed on Apr. 12, 2017, which claims priority to U.S. Provisional Patent Application Ser. No. 62/321,663, filed on Apr. 12, 2017; and a continuation of U.S. patent application Ser. No. 16/111,494 filed on Aug. 24, 2018, which claims priority to U.S. Provisional Patent Application Ser. No. 62/558,670. The referenced are hereby incorporated in their entirety.

FIELD

The present embodiment generally relates to low molecular weight amorphous butene-1-co-hexene-1 poly alpha olefins (ABH copolymers) for hot melt adhesive (HMA) formulations.

BACKGROUND

A need exists for low molecular weight ABH copolymers for hot melt adhesive formulations, that provide improved bonding to different substrates and lower temperature processing, while conserving energy during manufacturing.

The presented embodiments of this disclosure meet these needs.

BRIEF DESCRIPTION OF THE DRAWINGS

The detailed description will be better understood in conjunction with the accompanying drawings as follows:

FIG. 1 depicts a table providing weight percentages of the components of ABH copolymers (butene-1 and hexene-1 monomers), hydrogen pressure for control of molecular weight and F2/F3, the molar ratio of alkyl aluminum cocatalyst to organosilane donor; and FIG. 2 depicts a table of physical and mechanical properties of the ABH copolymers from the table of FIG. 1.

The present embodiments are detailed below with reference to the listed Figures.

DETAILED DESCRIPTION OF THE EMBODIMENTS

Before explaining the presented formulations in detail, it is to be understood that the disclosed formulations are not limited to the particular embodiments and can be practiced or carried out in various ways.

Specific structural and functional details disclosed herein are not to be interpreted as limiting, but merely as a basis of the claims and as a representative basis for teaching persons having ordinary skill in the art to variously employ the present invention.

The present invention generally relates to formulations suitable for use as hot-melt adhesives and pressure-sensitive adhesives (PSAs). More particularly, the invention relates to amorphous poly alpha olefin (APAO) adhesives.

Amorphous poly-alpha-olefins (APAO) are produced by the (co-) polymerization of α-olefins, e.g. propylene, ethylene or 1-butene, with Ziegler-Natta catalysts. The (co-) polymers have an amorphous structure which makes them useful in the formulation of hot melt adhesives.

U.S. Pat. No. 10,266,731, entitled "Amorphous hexene-1 based polymeric hot melt adhesive", describes a hot melt adhesive formulation which includes 60 to 99 wt. % of an amorphous propylene-co-hexene-1 polymer component based on the total weight of the hot melt adhesive without the use of flammable solvents, 20 to 80 wt. % of hexene-1 co-monomer based on the total weight of the amorphous propylene-co-hexene-1 copolymer component, 20 to 80 wt. % of a propylene co-monomer based on the total weight of the amorphous propylene-co-hexene-1 copolymer component, and from 1 to 40 wt. % of a co-adjuvant based on the total weight of the hot melt adhesive. The hot melt adhesive formulation has rolling ball tack from 2 to 50 centimeters at ambient temperature after conditioning at ambient temperatures for 24 hours. The hexene-1 monomer to propylene monomer ratios are from 4:1 to 1:4.

U.S. Pat. No. 10,160,888, entitled "Propylene-based Amorphous Poly Alpha Olefins (APAOS) Formulated with Hexene-1 Monomer Containing Amorphous Poly-Alpha-Olefins for Use in Hot Melt Adhesives", describes Amorphous poly-alpha-olefins (APAOs) such as propylene-co-hexene-1-co-butene-1 and propylene-hexene-1 which are used as tackifiers in hot melt adhesive formulations.

U.S. Pat. Nos. 5,681,913, 5,637,665, and 5,714,554 each entitled "High Tensile Strength Amorphous 1-Butene/Propylene and Ethylene/Propylene Copolymers," describe amorphous propylene/1-butene and ethylene/propylene copolymers having increased tensile properties produced by the process comprising: reacting propylene and 1-butene monomers or ethylene and propylene monomers in the presence of a catalyst system comprising: (a) a solid supported catalyst component may be prepared by the method comprising: (i) co-comminuting magnesium halide support base and aluminum tri-halide in a molar ratio from about 8:0.5 to about 8:3 in the absence of added electron donor; and (ii) then co-comminuting the product of step (i) in the absence of added electron donor with sufficient titanium tetra-halide to provide a molar ratio of magnesium halide to titanium tetrahalide from about 8:0.1 to about 8:1.0; (b) a trialkylaluminum co-catalyst, having from 1 to 9 carbon atoms in each alkyl group in an amount such that the Al/Ti ratio is between about 50:1 and about 500:1; and (c) an alkoxy silane component of the formula Rn Si(OR')4-n where n=1-3, R=aryl or alkyl and R'=C1-3 alkyl.

U.S. Pat. No. 5,302,675, "High Tensile Strength Amorphous 1-Butene/Propylene Copolymers," describes a process for the production of propylene/1-butene copolymers comprising: reacting propylene and 1-butene monomers in the presence of a catalyst system comprising: (a) a solid supported catalyst component may be prepared by the method comprising: (i) co-comminuting magnesium halide support base and aluminum trihalide in a molar ratio from about 8:0.5 to about 8:3 in the absence of added electron donor; and (ii) then co-comminuting the product of step (i) in the absence of added electron donor with sufficient titanium tetrahalide to provide a molar ratio of magnesium halide to titanium tetrahalide from about 8:0.1 to about 8:1.0; (b) a trialkylaluminum co-catalyst, having from 1 to 9 carbon atoms in each alkyl group in an amount such that the Al/Ti ratio may be between about 50:1 and about 500:1; (c) an alkoxy silane component of the formula Rn Si(OR') 4-n where n=1-3, R=aryl or alkyl and R'=C1-3 alkyl in a sufficient quantity such that the molar ratio of organoaluminum co-catalyst to alkoxy silane may be in the range from about 20:1 to about 45:1, said copolymer being characterized by a propylene content of 25 to 50 weight percent, a 1-butene content of 75 to 50 weight percent and a tensile strength of at least 300 psig.

U.S. Pat. No. 4,309,522, "Process for the production of extensively amorphous butene-1-propene-ethene copolymers having a high softening point," describes a process for preparing an extensively amorphous butene-1-propene-ethene terpolymer having a high softening point that comprises low pressure solution polymerizing butene-1, propene and ethene by contacting these monomers with a catalytically effective amount of a mixed catalyst of a thermally unstable crystalline TiCl3.0.30 to 0.35 AlCl3 and a trialkyl aluminum or dialkyl aluminum hydride, each having alkyl groups of 2-4 carbon atoms, the atomic ratio of Al:Ti being 0.8-4.0.

U.S. Pat. No. 4,322,514, "Process for preparing a copolymer," describes a process for preparing a non- or low-crystalline soft copolymer, characterized in that 50 to 98 mole percent of propylene, 0.2 to 30 mole percent of ethylene and 0.2 to 45 mole percent of a straight-chained α-olefin having not less than four carbon atoms are copolymerized using a catalyst, said catalyst comprising (1) a solid substance containing magnesium and titanium and (2) an organometallic compound.

U.S. Pat. No. 4,210,570, "Blends of substantially amorphous olefin copolymers, compatible tackifying resins and plasticizing oils useful as hot melt, pressure-sensitive adhesives", describes an adhesive composition capable of being used as a hot-melt, pressure-sensitive adhesive comprising a blend of (1) about 98 to 25 weight percent of a substantially amorphous or semicrystalline olefin copolymer containing at least one C.sub.3 to C.sub.5 linear alpha-olefin and 15 to 60 mole percent of at least one higher linear alpha-olefin of 6 to 10 carbon atoms, said copolymer having a melt viscosity of 5,000 to 1,000,000 centipoise at 190.degree. C., (2) 1 to 60 weight percent of at least one compatible tackifying resin, and (3) 1 to 25 weight percent plasticizing oil.

For the purposes of this specification and appended claims, unless otherwise indicated, all numbers expressing quantities, percentages or proportions, and other numerical values used in the specification and claims, are to be understood as being modified in all instances by the term "about." The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent, alternatively ±5 percent, and alternatively ±1 percent of the given numeric value provided such a deviation does not alter the end function or result of the value. Accordingly, unless indicated to the contrary, the numerical parameters set forth in this specification and attached claims are approximations that can vary depending upon the desired properties sought to be obtained by the present invention.

It is noted that, as used in this specification and the appended claims, the singular forms "a," "an," and "the", include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as "comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one", but it is also consistent with the meaning of "one or more", "at least one", and "one or more than one". Therefore, an element preceded by "a" or "an" does not, without more constraints, preclude the existence of additional identical elements.

The following definitions are used herein:

The term "amorphous butene-1-co-hexene-1 polymer component" can include long chains of butene-1 and hexene-1 monomers assembled together in a random order which inhibits the formation of crystalline structures or crystalline order.

The term "hot melt formulation" can refer to a thermoplastic material that is used neat, unformulated, or is blended, or formulated, with other materials to make a formulation with a broader use of application spectrum.

Butene-1-co-hexene-1 copolymers are typically made using a supported Ziegler-Natta catalyst system. The catalyst is activated by using an organometallic cocatalyst such as an alkyl aluminum.

Copolymers made according to this invention may be used in the formulation of improved-performance APAO-based hot melt adhesives.

Due to the compositional nature of butene-1-co-hexene-1 copolymer APAOs, each of the two comonomers, namely hexene-1, and butene-1, add a unique set of properties to the APAO, which may be enhanced, or changed, by the addition of an external organosilane donor.

These APAO copolymers may add unique properties when used as components in hot melt adhesives such as in pressure sensitive adhesives, personal hygiene products (e.g. diapers, feminine hygiene, elastic attachment, etc.), assembly, construction, lamination, footwear, and other applications that require such properties as permanent tackiness, controllable open time, low temperature flexibility, and other such desirable properties.

Amorphous poly alpha olefins are produced by the copolymerization of α-olefins, for example, ethylene (CAS #74-85-1), propylene (CAS #115-07-1), butene-1 (CAS #106-98-9), or hexene-1 (CAS #592-41-6), with Ziegler-Natta catalysts. The copolymers have an amorphous structure which makes them useful for the production, and as components, of hot melt adhesives.

Examples of APAOs include: amorphous (also known as atactic) polypropylene (APP, CAS #9003-07-0), amorphous poly(propylene-co-ethylene) (APE, CAS #9010-79-1), amorphous poly(propylene-co-butene-1) (APB, CAS #29160-13-2), amorphous poly(propylene-co-hexene-1) (APH, CAS #25895-44-7), and amorphous poly(butene-1-co-hexene-1) (ABH) copolymers, amorphous poly(propylene-co-ethylene-co-butene-1) (APEB, CAS #25895-47-0), amorphous poly(ethylene-co-butene-1-co-hexene-1) (AEBH, CAS #60785-11-7), and amorphous poly(propylene-co-butene-1-co-hexene-1) (APBH) terpolymers.

Due to the amorphous nature and lower molecular weights of APAOs when compared to other polymers, such as styrene block copolymers (SBCs), or metallocene catalyst synthesized polyethylenes and polypropylenes, said APAOs can be blended into the above copolymers at lower temperatures, such as at 275 to 375 degrees Fahrenheit.

APAOs exhibit a high degree of substrate wetting which is a very desirable HMA property. However, APAOs show relatively low cohesion, the entangled polymer chains having a fairly high degree of freedom of movement. Under mechanical load, most of the strain is dissipated by elongation and disentanglement of polymer chains, and only a small fraction reaches the adhesive-substrate interface. Cohesive failure rather than adhesive failure is therefore a more common failure mode of APAOs. The addition of other polymers, such as styrene block copolymers (SBCs) or metallocene catalyst synthesized polyethylenes and polypropylenes, can improve the cohesive strength of APAOs.

Amorphous butene-1 and hexene-1 containing poly alpha olefins, can be produced commercially in a continuously stirred tank reactor (CSTR) at an extended temperature range of 130 to 200 degrees Fahrenheit using a primary reaction catalyst. Alternatively, amorphous butene-1 and hexene-1 containing poly alpha olefins, can be produced in a Lab, using a high-pressure autoclave in a batch reaction process.

In some instances, the primary reaction catalyst can be a late transition metal supported Ziegler-Natta catalyst, and a co-catalyst such as an alkyl aluminum. In some instances, the primary reaction catalyst can be a metallocene-based catalyst.

In some instances, the amorphous butene-1-co-hexene-1 containing poly alpha olefins can be produced in the reactor vessel from a liquid pool of monomers.

In other instances, the amorphous butene-1-co-hexene-1 containing polyolefins can be produced in the reactor vessel from a liquid pool of monomers and non-reactive alkanes such as, for example, butane, pentane, hexane, heptane, octane, decane, dodecane, or combinations thereof.

In some instances, the co-catalyst can be an organoaluminum compound such as, trimethylaluminum (TMA, CAS #75-24-1), triethylaluminum (TEA, CAS #97-93-8), diethylaluminum chloride (DEAC, CAS #96-10-6), triisobutylaluminum, (TiBAl, CAS #100-99-2), or combinations thereof.

A hot melt adhesive (HMA) according to the present invention may be made using a butene-1-co-hexene-1 copolymer APAO with a hexene-1 content of about 10 weight percent, more preferably, about 20 weight percent, much more preferably with about 30 weight percent and most preferably with about 50 weight percent by weight but the butene-1-co-hexene-1 copolymer APAO can, in some instances, contain up to 90 weight percent.

The butene-1-co-hexene-1 copolymer may be synthesized with only butene-1 and hexene-1 monomers in the reactor. Hydrogen gas may be used as a chain transfer agent to control the molecular weight of ABH copolymers.

When the formed copolymer is applied, or coated onto a substrate, such as in the form of a hot melt adhesive, or is cast from an organic solvent solution onto a substrate typically such as stock paper, a plastic film or any other porous or non-porous substrate (the primary substrate) by any of the commercially known and used coating methods, the formed APAO copolymer bonds strongly to the primary substrate.

Pressure sensitive applications may show highly adhesive bonding to a variety of substrates. Such adhesion may be reversible and no adhesive may be transferred to the surface or secondary substrate or substrates onto which the primary substrate coated with the hot melt adhesive (HMA) subject of this invention, may be applied to.

This ABH copolymer may exhibit pressure sensitive adhesive (PSA) properties. The disclosed pressure sensitive adhesives can be highly desirable for removable applications such as removable tapes and labels.

The addition of an organosilane external donor during the reactor synthesis of the ABH copolymer, such as cyclohexylmethyl dimethoxysilane (CMDMS), or phenyltriethoxysilane (PES), can impart unique and valuable advantages to the physical and mechanical properties of the copolymer. These properties reflect favorably in the final performance of any hot melt adhesive containing ABH.

Additives may form a part of the subject HMA.

Useful additives may include polyethylene, maleic anhydride grafted polypropylene, Fischer-Tropsch waxes, paraffinic waxes, and metallocene catalyst synthesized waxes. These, as well as other similar compatible waxes, have one or more effects including controlling the melt viscosity and also controlling the rate of set of the HMA.

Other useful additives may include mineral, paraffinic, or naphthenic oils, which can be used in a copolymer based formulation to aid in the control of such properties as melt viscosity, tackiness, and open time. Other additional useful additives can be anti-oxidants and UV stabilizers.

Additional compatible polymers can be included in the formulation of the hot melt adhesive (HMA); for example, hydrogenated styrene block copolymers such as styrene-ethylene-butadiene-styrene (SEBS), and styrene-ethylene-propylene-styrene (SEPS) and polyethylenes, such as linear low density poly ethylene (LLDPE) of high melt indices, having a melt index of typically more than 500 dg/min, measured at 190 degrees Celsius, according to ASTM Test Method D-1238.

Also used, preferably as a minor component, may be metallocene catalyst synthesized polyethylenes, known in the art as mPEs and whose composition consists of ethylene, copolymerized with such alpha-olefins as 1-butene, 1-hexene or 1-octene. Alternatively, metallocene catalyzed polypropylenes (mPP), of an appropriate molecular weight, for example with a MFR greater than 100 dg/min., may also be combined with the base APAO copolymer as a minor component.

The butene-1-co-hexene-1 copolymer is made in a CSTR at a temperature between about 130 degrees Fahrenheit and about 200 degrees Fahrenheit. The CSTR may utilize a reactor pressure sufficient to maintain the butene-1 monomer in liquid phase (in the absence of any added solvent), and in the presence of about 0.1 to about 3.0 mol percent hydrogen, based on the monomer feed. Alternatively, the butene-1-co-hexene-1 copolymer, can be produced in a Lab, using a high-pressure autoclave in a batch reaction process.

In some embodiments, the butene-1-co-hexene-1 APAOs, can be made in the absence or presence of an externally added organosilane donor.

Some formulations may consist of between 0.1 to about 15 weight percent of the above-mentioned wax(es), or between 0.1 and 25 weight percent of the above mentioned oil(s). This will result in hot melt adhesives with enhanced properties for use in pressure-sensitive adhesives, personal hygiene products, (e.g. diapers, feminine hygiene, elastic attachment, etc.), assembly, and other such applications.

The above-named wax and plasticizer additives may interact with the long polymeric chains of the butene-1-co-hexene-1 APAOs made in the presence of an externally added organosilane donor in such a way as to result in an HMA with a lower, more desirable melt viscosity. This will also result in better wetting and penetration of various porous, or non-porous substrates, and a higher degree of adhesive bonding. Additionally, the interaction of the multiple components results in a higher yet controllable tackiness for applications which demand a certain degree of tackiness and pressure sensitive adhesiveness. Other interactions will become obvious to the user.

One benefit of this disclosed ABH copolymer is the wide temperature range that can be used in the blending of this hot melt adhesive, of from about 275 degrees to about 375 degrees Fahrenheit. Blending at the lower temperatures, results in an APAO hot melt adhesive such that much less fossil fuels are used by a facility.

The absence of solvents in the hot melt formulation avoids exposing wildlife to excursions of solvent vapors emitted from the manufacturing plant.

Several butene-1-co-hexene-1 copolymerization reactions were carried out in the presence of an organosilane external donor. External donors such as phenyltriethoxysilane (PES, CAS No. 780-69-8) or cyclohexylmethyl dimethoxysilane (CMDMS, CAS No. 17865-32-6) are more commonly used. Other silane-based external donors such as diphenyl dimethoxysilane (CAS No. 6843-66-9), diisobutyl dimethoxysilane (CAS No. 17980-32-4), dicyclopentyl dimethoxysilane (CAS No. 126990-35-0) and diisopropyl dimethoxysilane (CAS No. 18230-61-0) can also be used.

FIG. 1 is a table, containing examples 1 through 23 of the formulation. This table represents a total of 23 polymerization reactions with varying amounts of monomers, external donor, as represented by the F2/F3 molar ratio or the alkyl aluminum to donor ratio, and varied hydrogen pressures to control the melt viscosity or molecular weight of the produced polymers. The lower the F2/F3 ratio, the higher the concentration of donor added to the reactor at a constant alkyl aluminum concentration.

The polymerization reactions are carried out in the presence of a catalyst system, as described in, for example, U.S. Pat. Nos. 5,681,913, 5,637,665, and 5,714,554, incorporated herein as examples, comprising: (a) a solid supported catalyst component of the Ziegler-Natta type, (b) a trialkylaluminum co-catalyst, having from 1 to 9 carbon atoms in each alkyl group in an amount such that the molar Al/Ti ratio may be from 50:1 to 500:1; and (c) an external donor of the type described above.

In the Lab, the reactions were carried out in an Autoclave Engineers 1-L autoclave at 70 degrees Celsius for approximately one hour and a pressure sufficient to maintain the butene-1 monomer in a liquid phase. Polymerization reaction temperatures were maintained at about 70 degrees Celsius and with reaction times of about one hour. The reactions may also be run at temperatures of between 40 degrees and as high as 100 degrees Celsius. Further, reaction times may vary between 15 minutes and as along as 3 hrs.

The reactions may be run in the absence of any added organic solvent because the liquefied monomers, butene-1 and hexene-1, serve to a) remove the high exothermal heat of a polymerization reaction, and b) function as the suspension medium for the formed polymeric products. The butene-1 monomer used may be either high purity plant supplied butene-1 or bottled butene-1 from small tanks. Butene-1 purities are typically over 99+%. The hexene-1 used in our reactions is high purity (>97%).

Table 2 shows the results of the physical and mechanical characterization of the polymerization products depicted in table 1.

An embodiment of the ABH hot-melt formulation includes a butene-1-co-hexene-1 copolymer, formed by reacting butene-1 and hexene-1 monomers in a CSTR, using a supported Ziegler-Natta catalyst; a process temperature from about 130 degrees Fahrenheit to about 200 degrees Fahrenheit; a reactor pressure sufficient to maintain the butene-1 monomer in a liquid phase, in the absence of any added solvent, and a hydrogen concentration of about 0.1 to about 3.0 mol percent based on the monomer feed, creating a product with a melt viscosity, measured at 375 degrees Fahrenheit, according to ASTM Test Method D-3236, less than 5000 centipoise at 190 degrees Celsius.

The ABH hot melt formulation may include up to 10 percent of a hydrogenated styrene butadiene styrene block copolymer or a hydrogenated styrene isoprene styrene block copolymer with less than 15 percent bound styrene.

Also used, preferably as a minor component, may be metallocene-catalyzed polyethylenes, known in the art as mPEs and whose composition consists of ethylene copolymerized with such alpha-olefins as 1-butene, 1-hexene or 1-octene. Alternatively, metallocene-catalyzed polypropylenes, (mPP), of a molecular weight such that the MFR (melt flow rate) is greater than 100 dg/min., may also be combined with the base APAO as a minor component.

The hot melt formulation may also include a polypropylene polymer, with a melt viscosity above 18,000 centipoise (cps) as measured at 190 degrees Celsius. The polypropylene is comprised of a homopolymer, or a random copolymer of ethylene and propylene and a heat of fusion, as determined by Differential Scanning calorimetry, or DSC, of 20 to 60 J/g.

The ABH hot melt formulation includes from 0.1 weight percent to 10 weight percent of a low molecular weight polyethylene wax. The viscosity of the wax shall be less than 1000 centipoise at 350 degrees Fahrenheit and form an amorphous poly alpha olefin hot melt adhesive.

In some embodiments, the hot-melt formulation can include an externally-added organosilane donor added during the polymerization reaction.

In some embodiments, the butene-1-co-hexene-1 copolymer formed is more than 60 percent soluble in boiling heptane.

In some embodiments, the hydrogen concentration is present during the processing of monomers to copolymers in sufficient quantities to form a copolymer with a melt viscosity, measured at 190 degrees Celsius, of less than 5000 centipoise.

In some embodiments, the organosilane donor comprises cyclohexylmethyl dimethoxysilane (CMDMS), or phenyltriethoxysilane (PES).

In some embodiments, the alkyl aluminum is triethylaluminum (TEA).

In some embodiments, the organosilane donor in concentrations from $5.75 \times 10^{-6}$ to $5.75 \times 10^{-7}$ moles, based on the total moles of the butene-1 and hexene-1 comonomers, is added during the polymerization reaction.

In some embodiments, a functionalized polypropylene is added which contains from 0.1 to 3 weight percent of a with polar functionality, such as maleic anhydride, An embodiment of the hot-melt formulation includes a butene-1-co-hexene-1 copolymer, formed by reacting butene-1 and hexene-1 monomers, using a supported Ziegler-Natta catalyst; a process temperature from about 130 degrees Fahrenheit to about 200 degrees Fahrenheit; a reactor pressure sufficient to maintain the butene-1 monomer in a liquid phase, in the absence of any added solvent, and hydrogen gas in enough concentration, creating a product with a melt viscosity less than 5000 centipoise at 190 degrees Celsius.

This hot-melt formulation contains a single-site catalyzed polyethylene, consisting of ethylene copolymerized with either 1-butene, 1-hexene, or 1-octene. Alternatively, metallocene catalyzed polypropylenes, (mPP), of an appropriate molecular weight, with a MFR greater than 100 dg/min., may also be combined with the base APAO as a minor component.

This hot-melt formulation has either an atactic polypropylene homopolymer, an isotactic polypropylene homopolymer, or a random copolymer of ethylene and propylene and a heat of fusion, as determined by DSC, of 20 to 60 J/g. The viscosity shall be greater than 18,000 centipoise (cps), when measured at 190 degrees Celsius.

This hot-melt formulation includes a low molecular weight polyethylene wax, wherein the melt viscosity is less than 1,000 centipoise at 350 degrees Fahrenheit, and the composition comprises from 0.1 weight percent to 10 weight percent of the polyethylene wax, forming an amorphous poly alpha olefin hot melt adhesive.

In some embodiments, the butene-1-co-hexene-1 copolymer can be more than 60 percent soluble in boiling heptane.

In some embodiments, the hydrogen concentration present during the processing of monomers to copolymers is sufficient to form a copolymer with a melt viscosity, measured at 190 degrees Celsius, which is less than 5000 centipoise.

In some embodiments, a functionalized polypropylene can contain from 0.1 weight percent to 3 weight percent of a component with polar functionality.

In some embodiments, the component with polar functionality can be maleic anhydride.

The butene-1-co-hexene-1 based copolymers, described herein, are characterized by the following test methods: Melt Viscosity (MV), ASTM Test Method D-3236; Needle Penetration (NP), ASTM D-1321: Ring and Ball Softening Point (RBSP), ASTM E28; Rolling ball tack (RBT), PSTC test method 6, Loop Tack, PSTC test method 16 and Holding Power (HoPo), PSTC test method 107.

It should be noted that a primary use of the hot melt adhesive formulation is as a pressure sensitive adhesive (PSA).

Example 1 (See Table 1 and Table 2 Below)

A calculated amount of catalyst, cocatalyst and external donor, e.g. PES (targeting a F2/F3 ratio of 250) is added to a properly conditioned, Autoclave Engineers (Parker Autoclave Engineers. Erie, Pa.), 1-L autoclave, which is then loaded with 375 ml of butene-1 (53.6%) and 325 ml of hexene-1 (46.4%) and 85 psi of hydrogen pressure The reaction is started and maintained at a temperature of 70 degrees Celsius. After an hour, the polymerization reaction is stopped. Unreacted monomers are vented and a soft solid product is recovered. The properties are described in table 2 (shown in FIG. 2) and according to a test commonly used in the pressure sensitive industry, the RBT of 4.0+/−0.5 cm gives this example PSA properties.

Example 4 (See Table 1 and Table 2 in FIGS. 1 and 2, Respectively)

The same procedure as described in example 1 is employed, targeting a F2/F3 of 400, but adding 500 of butene-1 (71.4%), 200 ml of hexene-1 (28.6%) and 120 psi of hydrogen. The reaction is started and the reaction temperature is maintained at 70 degrees Celsius. After one hour, unreacted monomers are vented and a lower melt viscosity solid than example 1 is recovered. A RBT of 2.1+/−0.2 cm gives this example PSA properties.

Additional Example 24 (Not Enumerated in Table 1 and Table 2)

The hot-melt adhesive is based on a formulation of Example #1, which is a butene-1-co-hexene-1 copolymer, formed from butene-1 (53.6% butene-1 in the monomer blend) and hexene-1 monomers using a supported Ziegler-Natta catalyst, at a reactor pressure sufficient to maintain the butene-1 monomer in a liquid phase, in the absence of any added solvent, with a hydrogen concentration less than 1 mole percent based of the formed copolymer creating a product with a melt viscosity measured at 190 degrees Celsius which is less than 5000 centipoise.

The hot melt formulation may include up to 10 percent of a styrenic block copolymer containing less than 15 percent bound styrene. This may be a hydrogenated styrene butadiene styrene block copolymer or a hydrogenated styrene isoprene styrene block copolymer.

The hot-melt adhesive formulation may include up to 15 weight percent of a metallocene catalyst made mPE, such as for example AFFINITY® GA 1900 from Dow Chemical Company, having a melt viscosity of about 8,200 centipoise (cps) as measured at 177 degrees Celsius.

The hot-melt adhesive formulation includes 10 weight percent of a functionalized polypropylene known as POLYBOND 3000® from Addivant, with a melt viscosity above 18,000 centipoise (cps) as measured at 190 degrees Celsius.

The hot-melt adhesive formulation may include 6 weight percent of a low molecular weight polyethylene wax, wherein the melt viscosity of the wax is less than 1,000 centipoise at a temperature of 350 degrees Fahrenheit, forming an amorphous poly alpha olefin hot melt adhesive.

Additional Example 25 (Not Enumerated in Table 1 and Table 2)

These ABH formulations may include a copolymer consisting of 35.7 percent butene-1 and 64.3 percent hexene-1, based on a total reaction volume of 700 ml, reacted in the presence of a supported Ziegler-Natta catalyst, at a process temperature from 130 degrees Fahrenheit to 200 degrees Fahrenheit and at a reactor pressure sufficient to maintain the butene-1 monomer in a liquid phase, in the absence of any added solvent, with a hydrogen concentration less than 1 mole percent based on the formed copolymer, creating an APAO product with a melt viscosity less than 5000 centipoise at 190 degrees Celsius.

The hot-melt adhesive formulation may include 11 weight percent of a styrenic block copolymer with less than 15 percent bound styrene, comprising a hydrogenated styrene isoprene styrene block copolymer.

The hot-melt adhesive formulation may include 3 weight percent of a single-site catalyzed polyethylene, having ethylene copolymerized with 1-hexene with a melting point of 80 to 100 degrees Celsius.

The hot-melt adhesive formulation may include 10 weight percent of a polypropylene with a melt viscosity above 18,000 centipoise (cps), the polypropylene comprising a random copolymer of ethylene and propylene and with over 20 percent isotacticity.

The hot-melt adhesive formulation may include 10 weight percent of a low molecular weight polyethylene wax, wherein the melt viscosity of the wax is less than 1000 centipoise at a temperature of 350 degrees Fahrenheit, forming an amorphous poly alpha olefin hot melt adhesive.

While these embodiments have been described with emphasis on the embodiments, it should be understood that within the scope of the appended claims, the embodiments might be practiced other than as specifically described herein.

What is claimed is:

1. A hot-melt formulation comprising:
   a. a butene-1-co-hexene-1 copolymer, formed by reacting butene-1 and hexene-1 monomers, using a supported Ziegler-Natta catalyst, a process temperature from about 130 degrees Fahrenheit to about 200 degrees Fahrenheit, a reactor pressure sufficient to maintain the butene-1 monomer in a liquid phase, in the absence of any added solvent, and a hydrogen concentration less than 1 mole percent of the formed copolymer, creating a product with a melt viscosity less than 5000 centipoise at 190 degrees Celsius;
   b. a styrenic block copolymer with less than 15 percent bound styrene, comprising:
      (i) a hydrogenated styrene-butadiene-styrene block copolymer; or
      (ii) a hydrogenated styrene-isoprene-styrene block copolymer;
   c. a metallocene polyethylene, which consists of ethylene copolymerized with 1-butene, 1-hexene, or 1-octene, with a melt viscosity above 5000 centipoise as measured at 190 degrees Celsius;
   d. a polypropylene with a melt viscosity above 18,000 centipoise as measured at 190 degrees Celsius, the polypropylene comprising a homopolymer or random copolymer of ethylene and propylene and a heat of fusion, as determined by differential scanning calorimetry, of 20 to 60 J/g; and
   e. a low molecular weight polyethylene wax, wherein the melt viscosity of the polyethylene wax is less than 1,000 centipoise at a temperature of 350 degrees Fahrenheit, and the hot-melt formulation consists of from 0.1 weight percent to 10 weight percent of the polyethylene wax, forming an amorphous poly alpha olefin hot-melt adhesive.

2. The hot-melt formulation of claim 1, further comprising an externally-added organosilane donor added during a polymerization reaction.

3. The hot-melt formulation of claim 1, wherein the butene-1-co-hexene-1 copolymer is more than 60 percent soluble in boiling heptane.

4. The hot-melt formulation of claim 1, wherein the hydrogen concentration is present during the processing of monomers to copolymers sufficient to form a copolymer with a melt viscosity measured at 190 degrees Celsius which is less than 5000 centipoise.

5. The hot-melt formulation of claim 2, wherein the organosilane consists of:
   a. a cyclohexylmethyl dimethoxysilane (CMDMS); or
   b. a phenyltriethoxysilane (PES).

6. The hot-melt formulation of claim 2, wherein the organosilane is added during the polymerization reaction in concentrations from $5.75 \times 10^{-6}$ to $5.75 \times 10^{-7}$ moles based on the total moles of the butene-1 and hexene-1 comonomers.

7. The hot-melt formulation of claim 1, wherein the polypropylene contains from 0.1 weight percent to 3 weight percent of a component with polar functional.

8. A hot-melt formulation comprising:
   a. a butene-1-co-hexene-1 copolymer, formed by reacting butene-1 and hexene-1 monomers, using a supported Ziegler-Natta catalyst, a process temperature from about 130 degrees Fahrenheit to about 200 degrees Fahrenheit, a reactor pressure sufficient to maintain the butene-1 monomer in a liquid phase, in the absence of any added solvent, and a hydrogen concentration less than 1 mole percent of the formed copolymer, creating a product with a melt viscosity less than 5000 centipoise at 190 degrees Celsius;
   b. a styrenic block copolymer with less than 15 percent bound styrene, comprising a hydrogenated styrene-butadiene-styrene block copolymer or a hydrogenated styrene-isoprene-styrene block copolymer;
   c. a single-site catalyzed polyethylene polymer comprising ethylene copolymerized with 1-butene, 1-hexene, or 1-octene;
   d. the hot-melt formulation including a polypropylene polymer, with a melt viscosity above 18,000 centipoise (cps) when measured at 190 degrees Celsius, the polypropylene comprised of a homopolymer, or random copolymer of ethylene and propylene, with heat of fusion between 20 and 60 J/g and;
   e. a low molecular weight polyethylene wax, wherein the melt viscosity of the polyethylene wax is less than 1,000 centipoise at a temperature of 350 degrees Fahrenheit, and the hot-melt formulation consists of from 0.1 weight percent to 10 weight percent of the polyethylene wax, forming an amorphous poly alpha olefin hot-melt adhesive.

9. The hot-melt formulation of claim 8, further comprising an externally-added organo-silane donor added during a polymerization reaction.

10. The hot-melt formulation of claim 9, wherein the butene-1-co-hexene-1 copolymer is more than 60 percent soluble in boiling heptane.

11. The hot-melt formulation of claim 9, wherein the hydrogen concentration present during the processing of monomers to copolymers is sufficient to form a copolymer with a melt viscosity, measured at 190 degrees Celsius, which is less than 5000 centipoise.

12. The hot-melt formulation of claim 10, wherein the organosilane consists of:
   a. a cyclohexylmethyl dimethoxysilane (CMDMS); or
   b. a phenyltriethoxysilane (PES).

13. The hot-melt formulation of claim 10, wherein the organosilane is added during the polymerization reaction in concentrations from $5.75 \times 10^{-6}$ to $5.75 \times 10^{-7}$ moles based on the total moles of the butene-1 and hexene-1 comonomers.

14. The hot-melt formulation of claim 9, wherein the polypropylene contains from 0.1 weight percent to 3 weight percent of a component with polar functionality.

* * * * *